United States Patent [19]

Hashimoto et al.

[11] Patent Number: 5,330,692

[45] Date of Patent: Jul. 19, 1994

[54] PROCESS FOR PRODUCING AN ALUMINUM NITRIDE SINTERED PRODUCT

[75] Inventors: Noboru Hashimoto, Suita; Kyoji Tanaka, Kobe; Susumu Kajita, Hirakata; Hiroyoshi Yoden, Kadoma, all of Japan

[73] Assignee: Matsushita Electric Works, Ltd., Osaka, Japan

[21] Appl. No.: 89,558

[22] Filed: Jul. 12, 1993

[30] Foreign Application Priority Data

Dec. 22, 1992 [JP] Japan .................................. 4-342914
Jan. 26, 1993 [JP] Japan .................................. 5-010749
Jan. 26, 1993 [JP] Japan .................................. 5-010750

[51] Int. Cl.$^5$ ............................................. C04B 35/58
[52] U.S. Cl. .......................................... 264/65; 501/98
[58] Field of Search ............................. 264/65; 501/98

[56] References Cited

U.S. PATENT DOCUMENTS

| | | | |
|---|---|---|---|
| 4,711,861 | 12/1987 | Sawamura | 501/96 |
| 4,746,637 | 5/1988 | Kasori et al. | 501/98 |
| 4,877,760 | 10/1989 | Okuno et al. | 501/98 |
| 5,219,803 | 6/1993 | Yamakawa et al. | 501/98 |

FOREIGN PATENT DOCUMENTS 49111909 10/1974 Japan .
5849510 11/1983 Japan .
3146471 6/1991 Japan .
3197366 8/1991 Japan .

Primary Examiner—James Derrington

[57] ABSTRACT

An aluminum nitride (AlN) sintered product with a high thermal conductivity of 120 W/m·k or above can be produced at a relatively low sintering temperature of 1650° C. or below in accordance with the following process of the present invention. That is, an AlN powder having a specific surface in a region of about 3.5 to 8 m$^2$/g and an oxygen content between 0.5 to 1.8 wt % is mixed with optimum additive amounts of sintering aids (I) to (III) to obtain a mixture powder. The sintering aid (I) is at least one selected from the group consisting of rare earth oxides and rare earth compounds which are converted to corresponding rare earth oxides by the sintering. The sintering aid (II) is at least one selected from the group consisting of alkaline earth oxides and alkaline earth compounds which are converted to corresponding alkaline earth oxides by the sintering. The sintering aid (III) is at least one selected from the group consisting of LAB$_6$, NbC, and WB. The optimum additive amount of LaB$_6$ is in a range of 0.05 to 3 wt % of the AlN sintered product. The mixture powder is compacted, and then sintered at the sintering temperature in a non-oxidation atmosphere to obtain the AlN sintered product.

4 Claims, 2 Drawing Sheets

| | AlN (m²/g) | Sintering aid system |
|---|---|---|
| ◆ | 10 | 0.89CaCO$_3$-2Y$_2$O$_3$-0.5LaB$_6$ |
| ● | 7.5 | 0.89CaCO$_3$-2Y$_2$O$_3$-0.5LaB$_6$ |
| ○ | 4.5 | 0.89CaCO$_3$-2Y$_2$O$_3$-0.5LaB$_6$ |
| ▲ | 3.6 | 2.5CaCO$_3$-1.4Y$_2$O$_3$-0.5LaB$_6$ |
| □ | 1.5 | 2.5CaCO$_3$-1.4Y$_2$O$_3$ |
| ■ | 2.5 | 0.89CaCO$_3$-2Y$_2$O$_3$-0.5LaB$_6$ |

| | AlN (m²/g) | Sintering aid system |
|---|---|---|
| ♦ | 10 | 0.89CaCO₃-2Y₂O₃-0.5LaB₆ |
| ● | 7.5 | 0.89CaCO₃-2Y₂O₃-0.5LaB₆ |
| ○ | 4.5 | 0.89CaCO₃-2Y₂O₃-0.5LaB₆ |
| ▲ | 3.6 | 2.5CaCO₃-1.4Y₂O₃-0.5LaB₆ |
| □ | 1.5 | 2.5CaCO₃-1.4Y₂O₃ |
| ■ | 2.5 | 0.89CaCO₃-2Y₂O₃-0.5LaB₆ |

PROCESS FOR PRODUCING AN ALUMINUM NITRIDE SINTERED PRODUCT

BACKGROUND OF THE INVENTION

1. Field of the Invention

The present invention is directed to a process for producing an aluminum nitride sintered product with a high thermal conductivity at a relatively low sintering temperature.

2. Description of the Prior Art

Aluminum nitride (AlN) is an excellent material having a high thermal conductivity, insulation resistance and a low thermal expansion coefficient, etc. However, since aluminum nitride is a covalent bonding compound, it is difficult to produce a pure aluminum nitride sintered product without utilizing sintering aids or a hot-press sintering method.

U.S. Pat. No 4,746,637 discloses that a combination of $Y_2O_3$ and CaO as sintering aids. That is, a mixture of an AlN powder and the sintering aids is densely sintered at a temperature of 1650° C. or above to obtain an AlN sintered product. However, thermal conductivity of the AlN sintered product is only 100 W/m·k or less. For using as a substrate in a power module, etc., an AlN sintered product having a high thermal conductivity of 120 W/m·k or more is desired.

Japanese Early Publication [KOKAI]No. 03-146471 discloses that a combination of $Y_2O_3$ and $LaB_6$ is utilized as the sintering aids. In addition, Japanese Early Publication [KOKAI]No. 03-197366 discloses that a combination of CaO and $LaB_6$ is utilized as the sintering aids. Though AlN sintered products obtained by using these combinations of the sintering aids show a high thermal conductivity, a high sintering temperature of 1900° C. or above is required, so that it is necessary for expensive high temperature sintering furnace and fittings such as a setter capable of using at the high temperature. Additionally, there has been a problem of an expensive energy cost for producing the AlN sintered products.

In case of utilizing the hot-press sintering method for producing the AlN sintered product, though the sintering temperature can be lowered, a size or shape of the AlN sintered product would be limited.

SUMMARY OF THE INVENTION

An object of the present invention is to resolve the problems of the above prior art and to provide a process for producing an aluminum nitride (AlN) sintered product with a high thermal conductivity at a relatively low sintering temperature. In the present invention, an AlN powder having a specific surface in a range of about 3.5 to 8 $m^2/g$, and preferably 4.5 to 7.5 $m^2/g$, and an oxygen content between 0.5 and 1.8 wt %, is used. Optimum amounts of sintering aids are incorporated to the AlN powder. The sintering aids substantially consists of three sintering aids (I), (II) and (III). The sintering aid (I) is at least one selected from the group consisting of rare earth oxides and rare earth compounds. The rare earth compounds are converted to corresponding rare earth oxides by the sintering. The sintering aid (I) is incorporated such that an equivalent rare earth oxide amount thereof is in a range of 0 5 to 10 wt % in relation to the AlN sintered product. The sintering aid (II) is at least one selected from the group consisting of alkaline earth oxides and alkaline earth compounds. The alkaline earth compounds are converted to corresponding alkaline earth oxides by the sintering. The sintering aid (II) is incorporated such that an equivalent alkaline earth oxide thereof is in a range of 0.1 to 5 wt % in relation to the AlN sintered product. The sintering aid (III) is at least one selected from the group consisting of $LAB_6$, NbC, and WB. An additive amount of $LaB_6$ is in a range of 0.05 to 3 wt % of the AlN sintered product. On the other hand, additive amounts of WB and NbC are respectively in a range of 0.05 to 5 wt % of the AlN sintered product. A resulting mixture is compacted to a desired shape, and then sintered in a non-oxidation atmosphere at the sintering temperature of about 1650° C. or below. In accordance with the process of the present invention, the AlN sintered product with a high thermal conductivity of 120 W/m·k or more can be produced.

The features and advantageous of the present invention will become more apparent from the following description taken in conjunction with the attached drawings.

DESCRIPTION OF THE PREFERRED EMBODIMENTS

Figure 1:
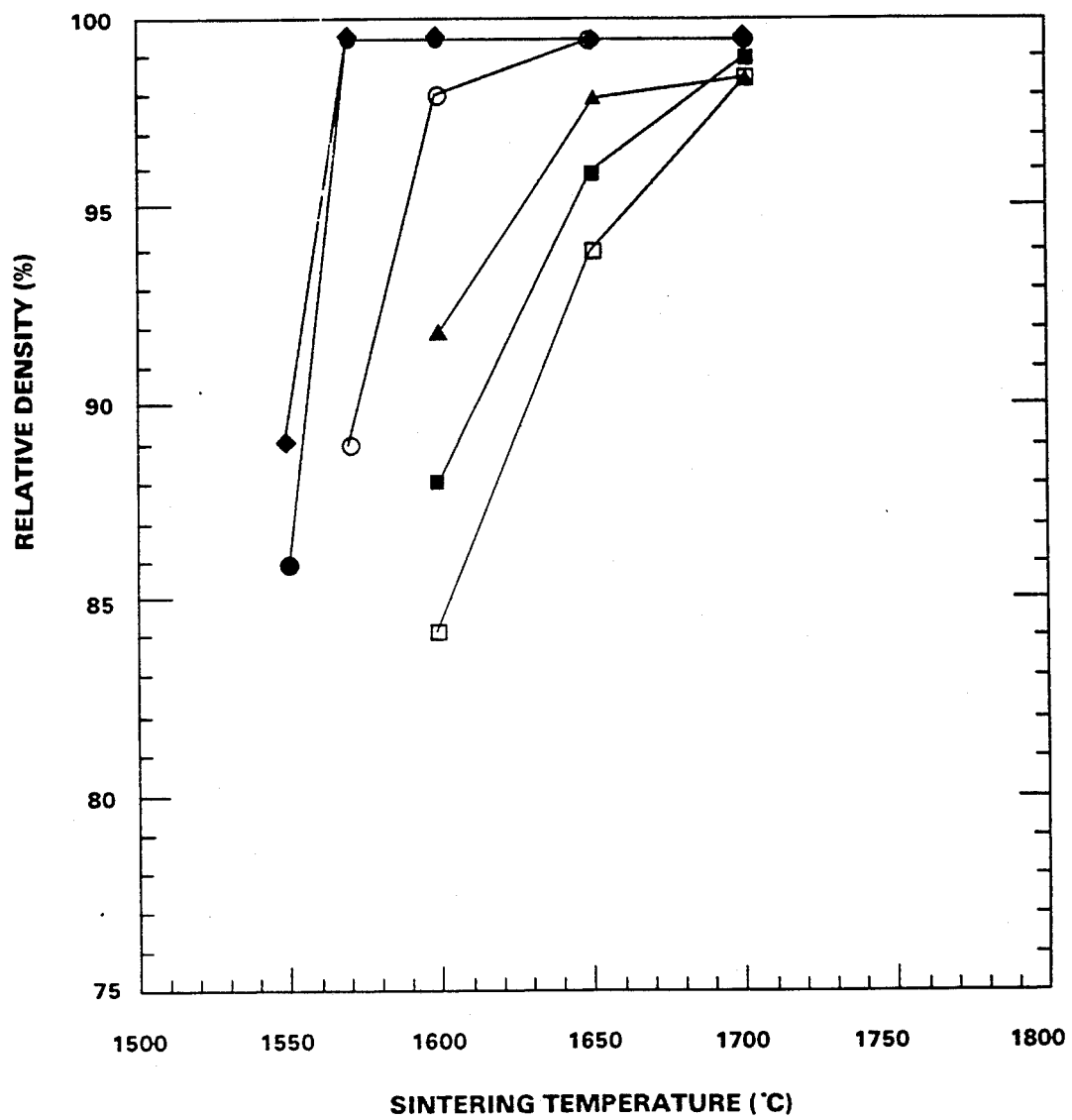
FIG. 1 is a diagram illustrating relative density-sintering temperature relations with respect to the AlN sintered products of EXAMPLES 14 to 25 of the present invention and COMPARATIVE EXAMPLES 10 to 20.

In the field of powder metallurgy, it is known that as an average particle size of a powder used for obtaining its sintered product is made smaller, the sintering temperature can be lowered in general. For example, an AlN powder having a specific surface in a range of about 10 to 14 $m^2/g$ is densely sintered at a temperature of about 1600° C. or below. However, as the AlN powder becomes fine, that is, the specific surface thereof increases, an oxygen content of the AlN powder also increases. When such an AlN powder having a high oxygen content is sintered, thus sintered product shows a low thermal conductivity. For example, in case that the AlN powder made by an usual carbothermal reduction method has the specific surface more than 10 $m^2/g$, the oxygen content of the AlN powder would be more than 1.8 wt %. Therefore, the AlN powder with a low oxygen content should be used for producing the AlN sintered product with a high thermal conductivity. In addition, it is requested that the AlN powder has an optimum specific surface so as to be sintered at the sintering temperature of about 1650° C. or below with use of sintering aids. Especially, when the sintering temperature is lowered to about 1650° C. or below, and preferably less than 1625° C, there has a considerable cost advantage because a cheep ceramic, e.g., aluminum oxide, can be used as fittings such as a setter placed in a furnace during the sintering instead of expensive hexagonal boron nitride (h-BN), and also energy for producing the AlN sintered product is conserved.

In the present invention, it is preferred that the AlN powder having the oxygen content between 0.5 to 1.8 wt % and the specific surface in a range of about 3.5 to 8 $m^2/g$, and more preferably 4.5 to 7.5 $m^2/g$, is used for enhancing a low temperature sintering thereof and improving the thermal conductivity of a resulting AlN sintered product. When the oxygen content of the AlN powder is more than 1.8 wt %, it becomes so difficult to produce the AlN sintered product with the high thermal conductivity by sintering the AlN powder at the sintering temperature of about 1650° C. or below. On the other hand, it is so difficult and expensive to prepare the AlN powder having the oxygen content less than 0.5 wt %. When the specific surface of the AlN powder is less than 3.5 m$^2$/g, the AlN powder would not be densely sintered at the sintering temperature of about 1650° C. or below. An average particle size of the AlN powder used in the present invention, which is calculated in accordance with the above range of the specific surface, is in a range of 0.20 $\mu$m to 0.46 $\mu$m. It is also preferred that the AlN powder made by the usual carbothermal reduction method is used in the present invention because an AlN powder made by an usual direct nitridation method has an unstable aluminum oxide layer, so that it is possible to increase the oxygen content of the AlN powder during a process for producing the AlN sintered product.

The sintering aids of the present invention are incorporated to the AlN powder. The sintering aids substantially consists of three sintering aids (I), (II) and (III). The sintering aid (I) is at least one selected from the group consisting of rare earth oxides and rare earth compounds. The rare earth compounds are converted to corresponding rare earth oxides by the sintering. The rare earth element in the sintering aid (I) may include Y, La, Dy, Er, Ce, Sm, Nd, Gd, Pr, Ho and Yb, and preferably Y and La. The rare earth compounds may include carbonates, nitrates, hydrides, and oxalates of these rare earth elements. Of course, it is not concerned that a combination of the rare earth oxide and the rare earth compound is used as the sintering aid (I). The sintering aid (I) is incorporated such that an equivalent rare earth oxide amount thereof is in a range of 0.5 to 10 wt % in relation to the AlN sintered product.

The sintering aid (II) is at least one selected from the group consisting of alkaline earth oxides and alkaline earth compounds. The alkaline earth compounds are converted to corresponding alkaline earth oxides by the sintering. The alkaline earth element in the sintering aid (II) may include Mg, Ca, Sr and Ba, and preferably Ca. The alkaline earth compounds may include carbonates, nitrates, hydrides, and oxalates of these alkaline earth elements. Of course, it is not concerned that a combination of the alkaline earth oxide and the alkaline earth compound is used as the sintering aid (II). The sintering aid (II) is incorporated such that an equivalent alkaline earth oxide amount thereof is in a range of 0.1 to 5 wt % in relation to the AlN sintered product.

The sintering aid (III) is at least one selected from the group consisting of LAB$_6$, NbC, and WB, and preferably LAB$_6$. The sintering aid (III) is capable of enhancing the low temperature sintering of the AlN powder, and also improving the thermal conductivity of the AlN sintered product. An optimum additive amount of LaB$_6$ is in a range of 0.05 to 3 wt % of the AlN sintered product. As the additive amount of LaB$_6$ is increased within the range, the thermal conductivity of the AlN sintered product is remarkably improved. However, an excess additive amount of LaB$_6$ more than 3 wt % inhibits the sintering. On the other hand, an optimum additive amount of NbC or WB is in a range of 0.05 to 5 wt % of the AlN sintered product. Similarly, as the additive amount of WB or NbC is increased within the range, the thermal conductivity of the AlN sintered product is improved. However, an excess additive amount of NbC or WB more than 5 wt % inhibits the sintering. In addition, the additive amount of the sintering aid (III) closely relates to the specific surface and the oxygen content of the AlN powder. In case of using the AlN powder having a relatively small specific surface and a low oxygen content, since it is expected that the AlN sintered product with a high thermal conductivity is obtained by sintering the AlN powder, a small additive amount of the sintering aid (III) within the corresponding range is enough to enhance the sintering of the AlN powder. On the contrary, in another case of using an AlN powder having a relatively large specific surface and a high oxygen content, a large additive amount of the sintering aid (III) within the corresponding range is required to improve the thermal conductivity of the AlN sintered product. It is also preferred that each compound in the sintering aid (III) has a purity of 99.9% or more, and an average particle size less than 10 $\mu$m for uniformly incorporating to the AlN powder.

A mixture of the AlN powder and the sintering aids (I) to (III) is compacted to a desired shape, and then sintered for about 2 to 10 hours in a non-oxidizing atmosphere at the sintering temperature of about 1650° C. or below. In case of using LaB$_6$ as the sintering aid (III), it is preferred that the sintering temperature is in a range of 1500° C. to 1640° C., and more preferably 1500° C. to 1625° C. On the other hand, in case of using WB or NbC as the sintering aid (III), it is preferred that the sintering temperature is in a range of 1550° C. to 1650° C. Therefore, when the sintering temperature is about 1625° C. or below, the process for producing the AlN sintered product of the present invention also presents the above described cost advantage. The non-oxidizing atmosphere may include an inert atmosphere such as N$_2$, and Ar, etc., a reducing atmosphere such as H$_2$, etc., and their a mixture of reducing and inert gaseous atmospheres. During the sintering in the non-oxidizing atmosphere, the sintering aids (I) to (III) are reacted with an aluminum oxide layer in the surface of the AlN powder to generate a complex oxide with a relatively low melting point. It is presumed that the complex oxide is capable of removing oxygen atoms from grain boundaries of the AlN sintered product, so that the thermal conductivity of the AlN sintered product is remarkably improved. However, the complex oxide is not identified up to the present because of the difficulty of analyzing. In accordance with the above described process of the present invention, the AlN sintered product with a high thermal conductivity of 120 W/m·k or more can be obtained.

EXAMPLE 1

An AlN sintered product of EXAMPLE 1 was produced in accordance with the following process. That is, an AlN powder containing 1.25 wt % of oxygen and having the specific surface of 5.0 m$^2$/g, sintering aids, and isopropyl-alcohol as a solvent were mixed with a ball mill to obtain a mixture powder. The sintering aids consist of Y$_2$O$_3$ as a sintering aid (I), CaCO$_3$ as a sintering aid (II), and LaB$_6$ as a sintering aid (III). Additive amounts of Y$_2$O$_3$, CaCO$_3$ and LaB$_6$ are 2.0 wt %, 0.89 wt % and 0.1 wt %, respectively. An equivalent CaO amount of CaCO$_3$ is 0.5 wt %. The mixture powder was compacted under a pressure 1.5 ton/cm$^2$ with a rubber press to a disc having the diameter of 20 mm and the height of 10 min. The disc was set in a boron nitride setter, and then sintered for 4 hours at a sintering temperature of 1600° C. in a non-oxidizing atmosphere including N2 gas to obtain the AlN sintered product of EXAMPLE 1.

AlN sintered products of EXAMPLES 2 to 25 and COMPARATIVE EXAMPLES 1 to 20 were produced in accordance with the substantially same process of EXAMPLE 1 except for producing conditions shown in TABLE 1.

With respect to EXAMPLES 1 to 25 and COMPARATIVE EXAMPLES 1 to 20, each AlN sintered product was grounded and polished to an AlN sintered disc having the diameter of 10 mm and the thickness of 3 mm, and then the relative density and the thermal conductivity of each AlN sintered disc were measured. A laser flush method was utilized for measuring the thermal conductivity. Results of the measurements are shown in TABLE 1.

Figure 2:
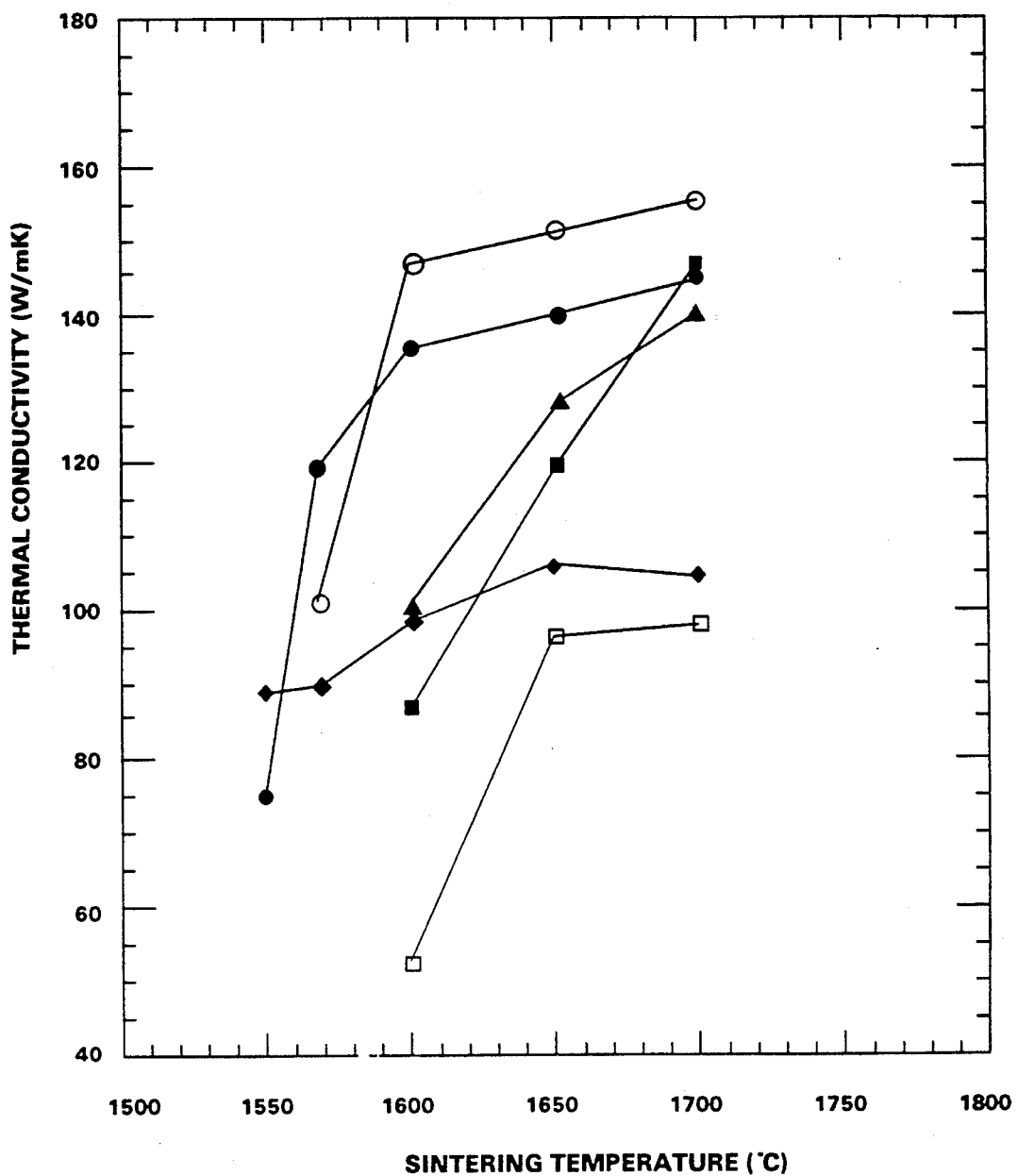
FIG. 2 is a diagram illustrating thermal conductivity-sintering temperature relations with respect to the AlN sintered products of FIG. 1.

For example, it is shown in FIGS. 1 and 2 that the mixture powder including the AlN powder having the specific surface of 7.5 $m^2/g$ and the oxygen content of 1.6 wt %, and the sintering aids consisting of 0.89 wt % of $CaCO_3$, 2 wt % of $Y_2O_3$ and 0.5 wt % of $LAB_6$, is sintered to the relative density of 99.5 % at the sintering temperature of 1600° C., and thus sintered product of EXAMPLE 23 shows the high thermal conductivity of 135 W/m·k. On the other hand, in the sintered product of COMPARATIVE EXAMPLE 18, which was obtained by sintering at 1600° C. the mixture powder including the AlN powder having the specific surface of 10 $m^2/g$ and the oxygen content of 2.20 wt %, and the same amounts of the sintering aids, the thermal conductivity thereof is not enough, that is, about 100 W/m·k, though the relative density thereof is 99.5%. This result indicates that even when optimum amounts of the sintering aids are mixed with the AlN powder, the use of the AlN powder having the specific surface in a range of about 3.5 to 8 $m^2/g$ and the oxygen content in a range of 0.5 wt % to 1.8 wt % is very important to obtain the AlN sintered product with the high thermal conductivity.

In EXAMPLE 19 and COMPARATIVE EXAMPLE 11, both of the sintered products were produced at the sintering temperature of 1650° C., and also the total amount of sintering aids of EXAMPLE 19 is almost equal to that of the sintering aids of COMPARATIVE EXAMPLE 11. However, the thermal conductivity of EXAMPLE 19 is much higher than that of COMPARATIVE EXAMPLE 11. This result suggests that the use of $LaB_6$ to the sintering aids is very effective for improving the thermal conductivity of the AlN sintered product.

Additionally, results in TABLE 1 indicate that the mixture powder including the AlN powder having the specific surface in the range of 3.5 to 8 $m^2/g$ and the oxygen content between 0.5 to 1.8 wt %, and optimum additive amounts of sintering aids of the present invention can be densely sintered at the sintering temperature between 1600° C. and 1650° C. to the relative density of 98% or above, and also thus sintered product shows a high thermal conductivity of 120 W/m·k or more.

By the way, since it is allowable to use a cheep aluminum oxide setter instead of the expensive BN setter in case of the sintering temperature of about 1625° C or less, the process for producing the AlN sintered product of the present invention also provides a considerable cost advantage.

TABLE 1

Producing conditions and properties of aluminum nitride sintered products of EXAMPLES 1 to 25 and COMPARATIVE EXAMPLES 1 to 20

|  | Specific Surface ($m^2/g$) | Oxygen Content (wt %) | Sintering Temp. (°C.) | Sintering Aids (wt %) | | | Relative Density (%) | Thermal Conductivity (W/m · k) |
|---|---|---|---|---|---|---|---|---|
|  |  |  |  | $Y_2O_3$ | $CaCO_3$ (CaO)* | $LaB_6$ |  |  |
| EXAMPLE 1 | 5.0 | 1.25 | 1600 | 2.0 | 0.89 (0.5) | 0.1 | 99.5 | 135 |
| EXAMPLE 2 | 5.0 | 1.25 | 1600 | 2.0 | 0.89 (0.5) | 0.2 | 99.0 | 137 |
| EXAMPLE 3 | 5.0 | 1.25 | 1600 | 2.0 | 0.89 (0.5) | 0.3 | 99.0 | 140 |
| EXAMPLE 4 | 5.0 | 1.25 | 1600 | 2.0 | 0.89 (0.5) | 0.4 | 98.5 | 145 |
| EXAMPLE 5 | 5.0 | 1.25 | 1620 | 2.0 | 0.89 (0.5) | 0.5 | 98.3 | 160 |
| EXAMPLE 6 | 6.5 | 1.40 | 1580 | 2.0 | 0.71 (0.4) | 0.6 | 98.3 | 130 |
| EXAMPLE 7 | 8.0 | 1.75 | 1570 | 3.0 | 0.89 (0.5) | 0.5 | 98.5 | 120 |
| EXAMPLE 8 | 5.5 | 1.32 | 1600 | 5.0 | 1.79 (1.0) | 0.8 | 98.0 | 135 |
| EXAMPLE 9 | 7.5 | 1.60 | 1600 | 7.0 | 1.79 (1.0) | 1.0 | 99.1 | 130 |
| EXAMPLE 10 | 4.6 | 1.15 | 1600 | 3.0 | 3.57 (2.0) | 0.5 | 98.0 | 140 |
| EXAMPLE 11 | 6.0 | 1.3 | 1620 | 3.0# | 0.89 (0.5) | 2.0 | 99.5 | 140 |
| EXAMPLE 12 | 3.5 | 1.0 | 1600 | 2.0 | 1.79 (1.0) | 1.0 | 93.5 | 106 |
| EXAMPLE 13 | 3.5 | 1.0 | 1650 | 2.0 | 1.79 (1.0) | 1.0 | 98.0 | 125 |
| EXAMPLE 14 | 3.6 | 1.0 | 1600 | 1.4 | 2.5 (1.4) | 0.5 | 92.0 | 100 |
| EXAMPLE 15 | 3.6 | 1.0 | 1650 | 1.4 | 2.5 (1.4) | 0.5 | 98.0 | 127 |
| EXAMPLE 16 | 3.6 | 1.0 | 1700 | 1.4 | 2.5 (1.4) | 0.5 | 98.5 | 140 |
| EXAMPLE 17 | 4.5 | 1.10 | 1570 | 2.0 | 0.89 (0.5) | 0.5 | 89.0 | 100 |
| EXAMPLE 18 | 4.5 | 1.10 | 1600 | 2.0 | 0.89 (0.5) | 0.5 | 98.5 | 145 |
| EXAMPLE 19 | 4.5 | 1.10 | 1650 | 2.0 | 0.89 (0.5) | 0.5 | 99.5 | 150 |
| EXAMPLE 20 | 4.5 | 1.10 | 1700 | 2.0 | 0.89 (0.5) | 0.5 | 99.5 | 155 |
| EXAMPLE 21 | 7.5 | 1.6 | 1550 | 2.0 | 0.89 (0.5) | 0.5 | 86.0 | 75 |
| EXAMPLE 22 | 7.5 | 1.6 | 1570 | 2.0 | 0.89 (0.5) | 0.5 | 99.5 | 120 |
| EXAMPLE 23 | 7.5 | 1.6 | 1600 | 2.0 | 0.89 (0.5) | 0.5 | 99.5 | 135 |
| EXAMPLE 24 | 7.5 | 1.6 | 1650 | 2.0 | 0.89 (0.5) | 0.5 | 99.5 | 140 |
| EXAMPLE 25 | 7.5 | 1.6 | 1700 | 2.0 | 0.89 (0.5) | 0.5 | 99.5 | 145 |
| COMPARATIVE EXAMPLE 1 | 3.3 | 0.8 | 1620 | 2.0 | 0.89 (0.5) | — | 92.0 | 100 |
| COMPARATIVE EXAMPLE 2 | 3.3 | 0.8 | 1600 | 1.0 | 3.57 (2.0) | 0.2 | 92.0 | 96 |
| COMPARATIVE EXAMPLE 3 | 9.0 | 2.1 | 1600 | 2.0 | 0.71 (0.4) | 0.8 | 99.5 | 109 |
| COMPARATIVE EXAMPLE 4 | 10.0 | 1.25 | 1600 | 2.0 | 0.89 (0.5) | — | 99.5 | 93 |
| COMPARATIVE EXAMPLE 5 | 5.0 | 1.25 | 1600 | 12.0 | 0.89 (0.5) | 0.1 | 87.0 | 55 |
| COMPARATIVE | 5.0 | 1.25 | 1600 | 2.0 | 0.09 (0.05) | 0.1 | 92.0 | 94 |

TABLE 1-continued

Producing conditions and properties of aluminum nitride sintered products of EXAMPLES 1 to 25 and COMPARATIVE EXAMPLES 1 to 20

|  | Specific Surface ($m^2/g$) | Oxygen Content (wt %) | Sintering Temp. (°C.) | Sintering Aids (wt %) | | | Relative Density (%) | Thermal Conductivity (W/m · k) |
|---|---|---|---|---|---|---|---|---|
|  |  |  |  | $Y_2O_3$ | $CaCO_3$ (CaO)* | $LaB_6$ |  |  |
| EXAMPLE 6 COMPARATIVE EXAMPLE 7 | 5.0 | 1.25 | 1600 | 2.0 | 21.43 (12.0) | 0.1 | 86.5 | 70 |
| COMPARATIVE EXAMPLE 8 | 5.0 | 1.25 | 1600 | 0.2 | 3.57 (2.0) | 0.1 | 96.0 | 90 |
| COMPARATIVE EXAMPLE 9 | 5.0 | 1.25 | 1600 | 2.0 | 0.89 (0.5) | 5.0 | 82.0 | 41 |
| COMPARATIVE EXAMPLE 10 | 1.5 | 0.7 | 1600 | 1.4 | 2.5 (1.4) | — | 84.0 | 52 |
| COMPARATIVE EXAMPLE 11 | 1.5 | 0.7 | 1650 | 1.4 | 2.5 (1.4) | — | 94.0 | 97 |
| COMPARATIVE EXAMPLE 12 | 1.5 | 0.7 | 1700 | 1.4 | 2.5 (1.4) | — | 98.5 | 99 |
| COMPARATIVE EXAMPLE 13 | 2.5 | 0.75 | 1600 | 2.0 | 0.89 (0.5) | 0.5 | 88.0 | 85 |
| COMPARATIVE EXAMPLE 14 | 2.5 | 0.75 | 1650 | 2.0 | 0.89 (0.5) | 0.5 | 96.0 | 118 |
| COMPARATIVE EXAMPLE 15 | 2.5 | 0.75 | 1700 | 2.0 | 0.89 (0.5) | 0.5 | 99.0 | 147 |
| COMPARATIVE EXAMPLE 16 | 10.0 | 2.20 | 1550 | 2.0 | 0.89 (0.5) | 0.5 | 89.0 | 87 |
| COMPARATIVE EXAMPLE 17 | 10.0 | 2.20 | 1570 | 2.0 | 0.89 (0.5) | 0.5 | 99.5 | 89 |
| COMPARATIVE EXAMPLE 18 | 10.0 | 2.20 | 1600 | 2.0 | 0.89 (0.5) | 0.5 | 99.5 | 99 |
| COMPARATIVE EXAMPLE 19 | 10.0 | 2.20 | 1650 | 2.0 | 0.89 (0.5) | 0.5 | 99.5 | 106 |
| COMPARATIVE EXAMPLE 20 | 10.0 | 2.20 | 1700 | 2.0 | 0.89 (0.5) | 0.5 | 99.5 | 105 |

(CaO)*: Equivalent CaO amount of $CaCO_3$
: 2 wt % of $Y_2O_3$ and 1 wt % of $La_2O_3$

EXAMPLE 26

An AlN sintered product of EXAMPLE 26 was produced in accordance with the following process. An AlN powder containing 1.29 wt % of oxygen and having the specific surface of 5.3 $m^2/g$, sintering aids, and isopropyl-alcohol as the solvent were mixed with the ball mill to obtain a mixture powder. The sintering aids consist of $Y_2O_3$ as the sintering aid (I), $CaCO_3$ as the sintoting aid (II), and NbC as the sintering aid (III). Additive amounts of $Y_2O_3$, $CaCO_3$ and NbC are 2 0 wt %, 1 79 wt % and 0 5 T.7% respectively The equivalent CaO amount of $CaCO_3$ is 1.0 wt %. The mixture powder was compacted under the pressure 1.5 ton/$cm^2$ with the rubber press to the disc having the diameter of 20 mm and the height of 10 mm. The disc was set in the boron nitride setter, and then sintered for 6 hours at the sintoting temperature of 1600° C. in the non-oxidation atmosphere including $N_2$ gas to obtain the AlN sintered product of EXAMPLE 26.

AlN sintered products of EXAMPLES 27 to 30 and COMPARATIVE EXAMPLES 21 to 30 were produced in accordance with the substantially same process of EXAMPLE 26 except for producing conditions shown in TABLE 2.

With respect to EXAMPLES 26 to 30 and COMPARATIVE EXAMPLES 21 to 30, each AlN sintered product was grounded and polished to the AlN sintered disc having the diameter of 10 mm and the thickness of 3 mm, and then the relative density and the thermal conductivity of each AlN sintered disc were measured. The laser flush method was utilized for measuring the thermal conductivity. Results of the measurements are shown in TABLE 2.

Results in TABLE 2 show that the mixture powder including the AlN powder having the specific surface in the range of 3.5 to 8 $m^2/g$ and the oxygen content in the range of 0.5 to 1.8 wt %, and the optimum additive amounts of the sintering aids of the present invention can be densely sintered at the about 1600° C. to the relative density more than 98% and also thus sintered product shows the high thermal conductivity of 120 W/m·k or more.

EXAMPLE 31

An AlN sintered product of EXAMPLE 31 was produced in accordance with the following process. That is, the AlN powder containing 1.29 wt % of oxygen and having the specific surface of 5.3 $m^2/g$, sintering aids, and isopropyl-alcohol were mixed with the ball mill to obtain a mixture powder. The sintering aids consist of $Y_2O_3$ as the sintering aid (I), $CaCO_3$ as the sintering aid (II), and WB as the sintering aid (III). Additive amounts of $Y_2O_3$, $CaCO_3$ and WB are 2.0 wt %, 1.79 wt % and 0.5 wt %, respectively. An equivalent CaO amount of $CaCO_3$ is 1.0 wt %. The mixture powder was compacted under the pressure 1.5 ton/$cm^2$ with the rubber press to the disc having the diameter of 20 mm and the height of 10 mm. The disc was set in the boron nitride setter, and then sintered for 6 hours at the sintering temperature of 1600° C. in the non-oxidation atmosphere including $N_2$ gas to obtain the AlN sintered product of EXAMPLE 31.

AlN sintered products of EXAMPLES 32 to 35 and COMPARATIVE EXAMPLES 31 to 40 were produced in accordance with the substantially same process of EXAMPLE 31 except for producing conditions shown in TABLE 3.

With respect to EXAMPLES 31 to 35 and COMPARATIVE EXAMPLES 31 to 40, each AlN sintered product was grounded and polished to the AlN sintered disc having the diameter of 10 mm and the thickness of 3 mm, and then the relative density and the thermal conductivity of each AlN sintered disc were measured. The laser flush method was utilized for measuring the thermal conductivity. Results of the measurements are shown in TABLE 3.

Results in TABLE 3 indicate that the mixture powder including the AlN powder having the specific surface in the range of 3.5 to 8 m²/g and the oxygen content between 0.5 to 1.8 wt % and the optimum additive amounts of the sintering aids of the present invention can be densely sintered at about 1600° C. to the relative density more than 98% and also thus sintered product shows the high thermal conductivity of 120 W/m·k or more.

TABLE 2

Producing conditions and properties of aluminum sintered bodies of EXAMPLES 27 to 30 and COMPARATIVE EXAMPLES 21 to 30

|  | Specific Surface (m²/g) | Oxygen Content (wt %) | Sintering Temp. (°C.) | Sintering Aids (wt %) | | | Relative Density (%) | Thermal Conductivity (W/m·k) |
|---|---|---|---|---|---|---|---|---|
|  |  |  |  | Y₂O₃ | CaCO₃ (CaO)* | NbC |  |  |
| EXAMPLE 26 | 5.3 | 1.29 | 1600 | 2.0 | 1.79 (1.0) | 0.5 | >98 | 137 |
| EXAMPLE 27 | 4.0 | 1.00 | 1625 | 2.0 | 1.79 (1.0) | 0.1 | >98 | 140 |
| EXAMPLE 28 | 7.5 | 1.60 | 1580 | 3.0 | 0.89 (0.5) | 3.5 | >98 | 121 |
| EXAMPLE 29 | 6.0 | 1.35 | 1600 | 2.0 | 0.89 (0.5) | 0.5 | >98 | 133 |
| EXAMPLE 30 | 4.5 | 1.10 | 1600 | 1.0 | 0.89 (0.5) | 0.5 | >98 | 147 |
| COMPARATIVE EXAMPLE 21 | 5.3 | 1.29 | 1650 | — | 1.79 (1.0) | 0.5 | 92.1 | 107 |
| COMPARATIVE EXAMPLE 22 | 5.3 | 1.29 | 1625 | 2.0 | — | 0.5 | 80.0 | 82 |
| COMPARATIVE EXAMPLE 23 | 5.3 | 0.8 | 1625 | 2.0 | 1.79 (1.0) | 0.5 | 93.0 | 99 |
| COMPARATIVE EXAMPLE 24 | 9.0 | 2.1 | 1600 | 2.0 | 1.79 (1.0) | 3.5 | >98 | 111 |
| COMPARATIVE EXAMPLE 25 | 5.3 | 1.29 | 1600 | 11.0 | 1.79 (1.0) | 0.5 | 86.0 | 56 |
| COMPARATIVE EXAMPLE 26 | 5.3 | 1.29 | 1600 | 2.0 | 0.09 (0.05) | 0.5 | 90.0 | 88 |
| COMPARATIVE EXAMPLE 27 | 5.3 | 1.29 | 1600 | 2.0 | 21.43 (12.0) | 0.5 | 87.0 | 68 |
| COMPARATIVE EXAMPLE 28 | 5.3 | 1.29 | 1600 | 0.15 | 1.79 (1.0) | 0.5 | 94.0 | 85 |
| COMPARATIVE EXAMPLE 29 | 5.3 | 1.29 | 1600 | 2.0 | 1.79 (1.0) | 8.0 | 82.0 | 40 |
| COMPARATIVE EXAMPLE 30 | 5.0 | 1.29 | 1600 | 2.0 | 1.79 (1.0) | — | >98 | 126 |

(CaO)*: Equivalent CaO amount of CaCO₃

TABLE 3

Producing conditions and properties of aluminum sintered bodies of EXAMPLES 31 to 36 and COMPARATIVE EXAMPLES 31 to 40

|  | Specific Surface (m²/g) | Oxygen Content (wt %) | Sintering Temp. (°C.) | Sintering Aids (wt %) | | | Relative Density (%) | Thermal Conductivity (W/m·k) |
|---|---|---|---|---|---|---|---|---|
|  |  |  |  | Y₂O₃ | CaCO₃ (CaO)* | WB |  |  |
| EXAMPLE 31 | 5.3 | 1.29 | 1600 | 2.0 | 1.79 (1.0) | 0.5 | >98 | 135 |
| EXAMPLE 32 | 4.0 | 1.00 | 1640 | 2.0 | 1.79 (1.0) | 0.1 | >98 | 142 |
| EXAMPLE 33 | 7.5 | 1.60 | 1580 | 3.0 | 0.89 (0.5) | 3.5 | >98 | 120 |
| EXAMPLE 34 | 6.0 | 0.35 | 1600 | 2.0 | 0.89 (0.5) | 0.5 | >98 | 130 |
| EXAMPLE 35 | 4.5 | 1.10 | 1600 | 1.0 | 0.89 (0.5) | 0.5 | >98 | 141 |
| COMPARATIVE EXAMPLE 31 | 5.3 | 1.29 | 1625 | 2.0 | 1.79 (1.0) | — | >98 | 113 |
| COMPARATIVE EXAMPLE 32 | 5.3 | 1.29 | 1625 | — | 1.79 (1.0) | 0.5 | 95.1 | 90 |
| COMPARATIVE EXAMPLE 33 | 5.3 | 1.29 | 1625 | 2.0 | — | 0.5 | 80.4 | 89 |
| COMPARATIVE EXAMPLE 34 | 3.3 | 0.8 | 1625 | 2.0 | 1.79 (1.0) | 0.5 | 94.0 | 104 |
| COMPARATIVE EXAMPLE 35 | 9.0 | 2.1 | 1600 | 2.0 | 1.79 (1.0) | 3.5 | >98 | 109 |
| COMPARATIVE EXAMPLE 36 | 5.3 | 1.29 | 1600 | 11.0 | 1.79 (1.0) | 0.5 | 85.0 | 55 |
| COMPARATIVE EXAMPLE 37 | 5.3 | 1.29 | 1600 | 2.0 | 0.09 (0.05) | 0.5 | 91.0 | 84 |
| COMPARATIVE EXAMPLE 38 | 5.3 | 1.29 | 1600 | 2.0 | 1.79 (1.0) | 7.0 | 82.0 | 50 |
| COMPARATIVE EXAMPLE 39 | 5.3 | 1.29 | 1600 | 0.10 | 1.79 (1.0) | 0.5 | 93.0 | 85 |
| COMPARATIVE EXAMPLE 40 | 5.3 | 1.29 | 1600 | 2.0 | 12.50 (7.0) | 0.5 | 90.0 | 74 |

(CaO)*: Equivalent CaO amount of CaCO₃

What is claimed is:

1. In a process for producing an aluminum nitride (AlN) sintered product, which comprises the steps of adding sintering aids to AlN powder to form a mixture, compacting the resulting mixture, and then sintering the compacted mixture at a sintering temperature in a non-oxidizing atmosphere;

said AlN powder having a specific surface area in a range of about 3.5 to 8 $m^2/g$ and an oxygen content between 0.5 and 1.8 wt %;

said sintering aids comprising:

a first sintering aid comprising at least one selected from the group consisting of rare earth oxides and rare earth compounds which are converted to corresponding rare earth oxides by said sintering, said first sintering aid being incorporated such that an equivalent rare earth oxide amount thereof is in a range of 0.5 to 10 wt % in relation to the AlN sintered product;

a second sintering aid comprising at least one selected from the group consisting of alkaline earth oxides and alkaline earth compounds which are converted to corresponding alkaline earth oxides by said sintering, said second sintering aid being incorporated such that an equivalent alkaline earth oxide amount is in a range of 0.1 to 5 wt % in relation to the AlN sintered product; and $LaB_6$ as a third sintering aid, an additive amount of said third sintering aid being in a range of 0.05 to 3 wt % of the AlN sintered product.

2. The process according to claim 1, wherein the sintering temperature is about 1650° C. or less.

3. The process according to claim 1, wherein the specific surface of said AlN powder is in a range of 4.5 to 7.0 $m^2/g$.

4. The process according to claim 1, wherein said third sintering aid further comprises at least one selected from the group consisting of WB and NbC.

* * * * *